United States Patent [19]
Colegrove

[11] 4,347,289
[45] Aug. 31, 1982

[54] USE OF S-119 IN LITHOGRAPHIC FOUNTAIN SOLUTIONS

[75] Inventor: George T. Colegrove, San Diego, Calif.

[73] Assignee: Merck & Co., Inc., Rahway, N.J.

[21] Appl. No.: 289,562

[22] Filed: Aug. 3, 1981

[51] Int. Cl.[3] ...................... B32B 15/04; C09K 13/04; C09K 13/06; C09K 13/02

[52] U.S. Cl. .................................. 428/457; 252/79.2; 252/79.4; 252/79.5; 156/639; 427/384; 428/532; 430/302; 430/309; 536/1; 536/114

[58] Field of Search .................... 252/79.2, 79.4, 79.5; 536/1, 114; 427/384; 435/104, 253, 822; 428/532, 457; 430/302, 309; 156/639

[56] References Cited

U.S. PATENT DOCUMENTS

| | | | |
|---|---|---|---|
| 3,276,360 | 10/1966 | Stimson et al. | 430/309 X |
| 3,489,561 | 1/1970 | Pickard | 430/309 X |
| 4,259,451 | 3/1981 | Steenberger et al. | 435/253 |

*Primary Examiner*—Michael R. Lusignan
*Attorney, Agent, or Firm*—Gabriel Lopez; Hesna J. Pfeiffer

[57] ABSTRACT

Polysaccharide S-119 is used as a desensitizer in lithographic fountain solutions to maintain non-image areas on a lithographic printing plate in a hydrophilic condition in order to prevent scumming or ink pickup in said areas. S-119 is prepared in aqueous solution which is added to phosphoric acid etch in water plus alcohol to provide a gum concentration of 20–1000 ppm by weight in the fountain solution.

9 Claims, No Drawings

USE OF S-119 IN LITHOGRAPHIC FOUNTAIN SOLUTIONS

BACKGROUND OF THE INVENTION

Lithographic printing, which is a type of planographic printing, is a well known and established art. In general, the process involves printing from a flat plate or cylinder having substantially no surface relief (hence, the term "planographic"), and depends upon different properties of the image and non-image areas of the surface for printability. In lithography, the image to be reproduced is imparted to the plate by any one of several methods well known to those skilled in the art in such a way that the non-image areas are rendered hydrophilic while the image areas are hydrophobic. A widely practiced technique employs a photosensitive coating for this purpose. Following exposure of the photosensitive coating to imagewise modulated light, the latent image is developed and a portion of the coating is removed from the plate. Next, the plate is treated with a desensitizing solution to render the plate hydrophilic in the areas from which the photosensitive coating has been removed. During the actual printing process, an aqueous fountain solution is applied to the plate surface. The fountain solution keeps moist all portions of the surface not covered by the hydrophobic image. Furthermore, the fountain solution prevents the plate from scumming, i.e. it prevents the non-image areas from becoming at least partially ink-receptive. The fountain solution may be formulated to gradually etch the surface of the plate just enough to keep the lines sharp and prevent rapid wear. In a conventional system, the fountain solution is applied to the plate by one or more rollers. At least one ink roller coated with an oil-based printing ink then contacts the entire surface of the plate but deposits the lithographic ink only on the image area since the hydrophilic non-image areas repel the ink. Hence, for each impression made during a run, the lithographic plate is first dampened with the aqueous fountain solution and then inked with a lithographic ink. Alternatively, the fountain solution and at least a portion of the oil-based ink are applied to the plate simultaneously with a first roller. In this latter system, other rollers, usually smaller in diameter than the first, may contact the plate subsequently to distribute the ink more evenly. Finally, the ink image is transferred directly to a paper sheet or other receptive surface to be printed, or to an offset blanket of rubber or synthetic material which in turn transfers the print to the final copy surface.

Gum arabic has long been used in aqueous solutions (both acidic and alkaline) in the preparation of lithographic plates. Gum arabic has been used, for example, in solutions for developing a latent image; as a desensitizing ingredient in a gumming solution—sometimes in combination with an etchant, in which case the solution is referred to as a gum etch—to make the non-image areas sharply defined and ink repellent, i.e. hydrophilic rather than hydrophobic; in a fountain solution, again sometimes in combination with an etchant, to keep the non-image areas hydrophilic during the press run; as a protective coating during idle periods on the press or even during storage for weeks and months; and in plate cleaner formulations.

Gum arabic is a natural product obtained as an exudate from acacia trees. The disadvantages of gum arabic are well recognized in the trade and a suitable substitute has long been sought.

Some of the compositions heretofore proposed as gum arabic substitutes for the treatment of image-bearing plates include oxalic acid (U.S. Pat. No. 3,489,561), homopolymers and copolymers of itaconic acid (U.S. Pat. No. 3,507,647), sodium carboxymethycellulose (U.S. Pat. No. 3,166,421), the copolymer of methyl vinyl ether and maleic anhydride (ibid.), polyacrylic acid (U.S. Pat. No. 3,211,686) and sodium and ammonium salts thereof (Japanese Patent Publication No. 49-6561 (1974), alginic acid and the sodium salt thereof, polyvinyl alcohol (U.S. Pat. No. 3,607,255), and polyacrylamide-based polymers, optionally blended with polyacrylic acid (U.S. Pat. No. 4,200,688). Gum arabic continues to be the composition of choice in industry, notwithstanding all of its disadvantages.

SUMMARY OF THE INVENTION

It has now been found that heteropolysaccharide S-119 can be used as a desensitizer as a replacement for gum arabic in lithographic fountain solutions. S-119 solutions can also be used for the long-term storage of lithographic plates.

Gum arabic is normally used as a 14° Baume solution (approximately 25%) concentrate which is added to an acidic fountain solution at the rate of 0.5–2 oz. per gallon. S-119 is added as about a 1.0% solution and is therefore effective at one-twentyfifth the level of gum arabic. Effective concentrations will be 0.5–2 oz. per gallon of gum concentrates containing 0.5–5.0% S-119, preferably 0.5–2.0% S-119. S-119 can thus be used at much lower concentrations than gum arabic and still maintain non-image areas in a hydrophilic or desensitized condition. Excessive buildup of acid gum particles on dampening rollers is thus minimized.

DETAILED DESCRIPTION

S-119 and a process for preparing it are described in U.S. Pat. No. 4,259,451.

This invention comprises aqueous lithographic fountain solutions containing 20–1000, but preferably 20–800 ppm gum by weight S-119 and 15–25% alcohol preferably 20%. By alcohol is meant lower alkyl mono- and polyhydric alcohols and glycol ethers having a molecular weight of about 170 or less. When an acid solution is prepared, it should also contain 0.02–0.15% (by wt.) of a metal nitrate salt, such as of zinc or magnesium.

The fountain solutions can be alkaline (pH 8.5–10) or acidic (pH 3–5.5, but preferably 4–4.5). Typically, an alkali metal hydroxide such as NaOH is used for alkaline solutions and an inorganic acid such as phosphoric acid is used for acidic solutions.

S-119 is used in accordance with the invention as a desensitizer. Desensitization refers to the depositing in the non-image areas of an image-bearing lithographic plate of an adequate protective film of a hydrophilic substance to prevent the plate from picking up ink in such areas from the inking roller during printing or from retaining ink from a sponge or a tissue wiped across the plate surface during screening tests.

Following printing, S-119 solutions can also be used for long-term storage of plates. Storage of up to 18 weeks has been demonstrated but even more prolonged storage is within the scope of this invention. The storage composition comprises an 0.5–5% (by wt.) aqueous solution of S-119. This solution is coated onto a cleaned lithographic plate, as by wiping with a soaked cloth or sponge, and then allowed to dry, as by air drying. The plates can then be stored for a prolonged period of time and then re-used for lithiographic printing without loss in image quality or printing ability.

In order to compare S-119 with gum arabic in lithographic fountain solutions, control litho plates were identically prepared and fountain solutions were prepared with gum arabic and S-119. These tests are described in the following examples. These examples are also illustrative of the fountain solutions that can be prepared with S-119 and the invention is not intended to be limited thereto.

EXAMPLE 1

Preparation of Control Plates

The plates used throughout were Azoplate Enco N.50, subtractive, negative working, presensitized aluminum for lithographic offset use. Using the shingled packing test form, all plates were exposed, developed and finished using conventional procedures, on a Berkey Ascor Printing Systems unit with 150 units, exposure, using Ascor Addalux mercury vapor 5 kw lamps. This test is described in GATF Technical Services Report No. 23 (GATF, 4615 Forbes Avenue, Pittsburgh, Pa. 15213), which is incorporated herein by reference. For the control plates, chemicals used were the plate manufacturer's supply. Plate processing was as follows:

1. Enco subtractive developer.
2. Water rinse.
3. Finish with Enco NMD Developer, and Finisher, in a plate processor.

EXAMPLE 2

Preparation of Fountain Solutions

Fountain solutions for press printing were mixed as noted:

1. A fountain etch concentrate consisting of
   90 gm Zinc nitrate hexahydrate
   8 cc Phosphoric acid 85% mixed with water to bring up to a 1000 ml. solution.
2. Fountain solutions, incorporating the above fountain etch concentrate, as follows:
   (a) Gum Arabic
      ½ oz. of etch concentrate
      1 oz. Gum Arabic, pure solution (14° Baume).
      20% Alcohol in one gallon of water.
   (b) S-119
      ½ oz. of etch concentrate
      1 oz. S-119, 1% solution
      20% Alcohol in one gallon of water.

EXAMPLE 3

Printing Trials

The tests were run under the following conditions:

Press: Sheetfed offset Miehle "Favorite" 19"×25", single color press, with Dahlgren alcohol dampening;

Press cylinder packing: appropriate for shingled packing form operation;

Blanket: Dayco True Dot compressible;

pH: between 4.5 and 5.5;

Alcohol: 20% in water;

Ink: Inmont Center Line Black;

Press speed: 5,500 to 7,500 impressions per hour (i.p.h).

The object of the test procedure is to challenge the ability of plate and press materials to function correctly and efficiently in observed conditions, as explained in GATF Technical Services Report No. 23. The objective is efficiency in image inking, non-image area protection and acceptable printing quality in the appropriate portion of the shingle-packed image as printed at speeds from 5,500 to 7,500 i.p.h.

Printing trials began with a control plate and gum arabic fountain solution, mixed as noted in Example 2. The commercial practice of dropping ink rollers on the plates when beginning the printing sequence was used.

Printing with the gum arabic fountain solution established the optimum conditions of correct inking, desensitization of non-image areas and level of print quality. Running at 5,500 i.p.h. at printing ink densities of 1.5 to 1.6, all images printed satisfactorily at Step 3 from the gripper edge. Solids were adequately covered, Star Targets were clean and sharply printed, with good resolution and clean centers. Tints and toned steps and halftones were clean, without plugging in shadow areas. One thousand sheets were run to a satisfactory level of print quality at which point the printing was stopped.

A test for good desensitizing of the non-image areas of the plate was also made during this printing operation, sometimes called "honing". In a non-image area, the plate is first cleaned for about ½"×½" with an erasing stone and an application of asphaltum gum etch (A.G.E.) protective coating. If, on resuming the run, the area remains clean, the desensitizing gum is protecting the non-image area as it should. In this case, the honed area, located by Step 1 between tint area and Star Target and bullet, remained clean, although other non-image areas began to scum.

Next, using a 1% S-119 fountain solution as described in Example 2, another control plate was put on the press and rolled up quite well, with clean images and good desensitization of non-image areas. Ink density was 1.58. Tints were printing evenly, as were halftones, from highlight to shadow areas. At this point, the results were good by comparison to the control prints with the sum arabic fountain solution. The honed area remained clean throughout printing. A total of 1,000 sheets were printed of good overall quality in all respects.

EXAMPLE 4

Plate Storage Evaluations

The litho plates from Example 3 were placed in storage after completion of the tests to keep them in normal, average, plate storage conditions, then to prepare them for press printing under practical commercial printing conditions, and to print with them. Approximately 18 weeks afterwards, the plates were taken out of storage and put to press.

The storage solutions were aqueous solutions of
(1) 25% (wt) gum arabic, and
(2) 1% (wt) S-119.

Optimum press conditions were the use of normal packing, and normal packing pressures. After mounting on press, each plate was subjected to immediate dampening as the dampening rollers were dropped followed by immediate inking and printing of about 100 sheets. These are harsh and extreme conditions but not unusual in practical printing conditions. Immediately after the first printing, each plate was cleaned up with Lith-Kem- Ko A.G.E. (asphaltum gum etch) and a further quantity of sheets printed.

1. Gum arabic solution

After previously being used for printing, this plate was cleaned and rubbed up with Western A.G.E. After initial roll up and inking, as detailed, there was a slight blinding—all image areas were quite ink receptive and after cleaning up with Lith-Kem-Ko A.G.E., printed quite cleanly and sharply. The plate was then allowed to run and 150 to 200 sheets were printed with satisfactory results. There was no ink scum on non-image areas and at a black ink density of 1.65 (reflection densitometer). A slight marking on the image area was caused by water, but this responded to slight rubbing with A.G.E., after which another 150 sheets were printed satisfactorily. Press speed was approximately 5 to 6,000 impressions per hour.

2. S-119 solution

This plate was cleaned after printing and a 1% S-119 solution was applied. The same press treatment was used as for the gum arabic plate—the result was about the same as for the control plate. A.G.E. was used to clean up the plate and sheets were printed. The result was dramatically better, with clean non-image areas. Two halftones, however, were blinding slightly. A further etch cleaning was applied, and additional press sheets were printed which were almost free of blinding. Total paper run was around 500 sheets.

What is claimed is:

1. An aqueous lithographic fountain solution, having a pH of 3–5.5 or 8.5–10, which comprises 20–1000 ppm heteropolysaccharide S-119 and 15–25% alcohol, with the proviso that when the pH is 3–5.5 the solution further comprises 0.02–0.15% (by weight) metal nitrate salt.

2. A fountain solution of claim 1 wherein the pH is 3–5.5 and the metal nitrate salt is zinc nitrate.

3. A fountain solution of claim 2 comprising phosphoric acid.

4. A fountain solution of claim 2 comprising 20–800 ppm heteropolysaccharide S-119 and 20% alcohol.

5. A fountain solution of claim 1 wherein the pH is 8.5–10 comprising NaOH.

6. A process for desensitizing an image-bearing lithographic plate during printing which comprises applying to said plate an aqueous solution of claim 1.

7. A process of claim 6 wherein the aqueous solution is of claim 2 or 5.

8. A method of storing image-bearing lithographic plates for prolonged periods of time which comprises coating said plates with an aqueous solution of 0.5 to 5% (by weight) heteropolysaccharide S-119.

9. A method of claim 8 wherein the solution is 1% by weight heteropolysaccharide S-119.

* * * * *